3,000,845
PROCESS OF PROMOTING CRYSTALLIZATION OF ISOTACTIC POLYSTYRENE WITH A CRYSTALLIZATION ENHANCER
Kenneth W. Doak and Arnold E. Jeltsch, Pittsburgh, Pa., assignors to Koppers Company, Inc., a corporation of Delaware
No Drawing. Filed Sept. 17, 1959, Ser. No. 840,522
6 Claims. (Cl. 260—30.6)

This invention is concerned with crystalline polystyrene and more particularly with a method for promoting the crystallization of isotactic polystyrene.

Styrene monomer polymerizes through the vinyl group in a head to tail fashion to yield a polymer molecule which is a long chain of carbon atoms with hydrogen and phenyl groups attached thereto. The carbon atoms bearing the phenyl groups may be asymmetric, in which case the phenyl groups are arranged in a random manner above and below the carbon chain, or symmetric, in which case the phenyl groups are arranged either all above or all below the carbon chain for considerable segments of the chain. Polystyrene with the asymmetric arrangement of phenyl groups is known as atactic, and polystyrene with the symmetric arrangement is known as isotactic.

Atactic polystyrene lacks both crystallinity and high inter-molecular forces, either of which prevents its use above the second order transition temperature. Isotactic polystyrene, which is partially crystalline, has amorphous regions with the second order transition temperature above room temperature, which makes it brittle at use temperature; while at the same time its crystallinity confers rigidity and dimensional stability, almost up to the melting point of the crystallites. The rigidity and dimensional stability above the heat distortion temperature permits the use of isotactic polystyrene in applications where the atactic polystyrene, because it lacks the above properties, would not be appropriate.

Isotactic polystyrenes may be prepared using the Alfin catalyst systems, which is a sodium isopropoxide allyl sodium-sodium chloride, or with a Ziegler type system such as triisobutylaluminum-titanium tetrachloride.

In a typical preparation, using the Ziegler type catalyst, in resin kettles equipped with the stainless steel agitator designed to circulate the reaction mass from bottom to top, the reactor was purged by evacuation and thereafter a slow stream of nitrogen was admitted and maintained during the polymerization. Heptane, an inert reaction vehicle, was added; then the aluminum alkyl and titanium tetrachloride were added with agitation. The system was continuously stirred for one hour in order that the catalyst complex could form. Thereafter, the temperature was adjusted to 60° C. and the monomer was added. The reaction mass became quite thick with a suspended dark polymer after a period of 1–3 hours, and agitation became increasingly difficult. After twenty hours polymerization was terminated and the reaction mass was treated with an equal volume of heptane followed by the addition of one volume of butanol in order to deactivate and leach the deactivated catalyst from the polymer. Additional leaching with butanol and methanol in a Waring Blendor converted the polymer to an easily filterable white powder, which was dried in a vacuum to remove solvents. The percent conversion to polystyrene is from 40–50. The crystallizable portion is about 50–60 percent when determined by X-ray diffraction. However, to process the material into a usable shape the polystyrene must be melted, which of course destroys the crystallinity.

This uncrystallized material is difficult to extrude, even at the high temperature of 250° C. It cannot be drawn into threads and exhibits a pronounced tendency to supercool into an amorphous state. In this amorphous state the properties are not greatly different in many respects from atactic polystyrene. In order to make maximum use of the properties of the uncrystallized isotatic polystyrene it is annealed. In a typical isotactic polystyrene annealing at 160° C. for 30 minutes, results in partial crystallization, to the extent of 25%, based on X-ray diffraction. In order to obtain the ultimate amount of crystallinity the polymer has to be annealed at 160° C. for a period of 3 hours.

It has now been found that the annealing time required to obtain an isotactic polystyrene of maximum crystallinity may be substantially decreased, that is, from the previously required three hours to 30 minutes or less, by incorporating with the isotactic polystyrene prior to annealing a crystallization enhancer which is a liquid or low melting solid, that is relatively unvolatile and contains at least 12 carbon atoms. The term "low melting" means a melting point of approximately 100° C. at atmospheric pressure.

The amount of enhancer used may vary with the amount of crystallizable material present in the polymer, but is within the range of 0.275–0.667 part of enhancer per part of crystallizable polystyrene present in the polymer. The optimum amount for a particular isotactic polystyrene may be readily determined experimentally.

The annealing time varies with the temperature used. Generally the higher the temperature used the shorter the time required. However, the temperature used must not exceed the melting point, which is generally found to be about 220° C.

Typical crystallization enhancers are triaryl phosphates, such as tricresyl phosphate, the hydrogenated and halogenated polyphenyls such as Arochlor by Monsanto Chemical Co. and HB–40 manufactured by Monsanto Chemical Co., the alkyl diesters of dibasic acids such as di-n-butyl-phthalate and di(2-ethylhexyl) phthalate, and the fatty acid esters of ether-alcohols, such as butyl Cellosolve stearate.

In accordance with the practice of this novel invention the desired amount of crystallization enhancer is incorporated into the polystyrene by any of the common mixing methods used in the art, such as a Banbury or Bolling mixer, or two-roll mill. The resulting material may then be further processed, as desired. Such processing could include extrusion, injection molding or thermoforming. Thereafter the formed composition is annealed.

The following examples are given by way of illustration but not by way of limitation.

Five hundred grams of isotactic polystyrene were prepared according to the previously described procedure using an aluminum alkyl TiCl$_4$ catalyst complex. The percentage of crystallizable polymer was determined by visual examination of a flat film X-ray pattern, and found to be about 60%. This material was used in the following examples.

EXAMPLE I

Forty-two and one half grams of the prepared isotactic polystyrene was slurried in 130 ml. of heptane to which 7.5 grams of tricresyl phosphate had previously been added. The resulting thick paste was added portion-wise to a 2" two-roll rubber mill, both rolls of which were heated to 340° F. The heptane was volatilized and tricresyl phosphate intimately mixed with the polymer. The resulting mixture containing 15% by weight of the tricresyl phosphate intimately mixed with the isotactic polystyrene. Twenty grams of this material was placed in a Castor-Severs extrusion rheometer where it was heated to 260° C. and extruded through a ⅟₃₂" diameter orifice by the applicaton of 750 pounds per square inch nitrogen pressure. The extruded polymer, after cooling to room temperature, was examined by X-ray diffraction and found to be amorphous. A portion of this material was then drawn at 75–80° C. to several hundred percent of its original length. X-ray diffraction showed that this drawn material was about 5% crystalline and highly oriented. The drawn strand was clamped in an extended condition and annealed at 160° C. for 30 minutes. The crystallinity was again determined by X-ray diffraction methods, and found to have increased to 60%. The high degree of orientation was retained.

A 20 gram sample of the isotactic polystyrene was extruded in the Castor-Severs rheometer at 250° C. through a ⅟₃₂ inch diameter orifice by the application of 750 pounds per square inch nitrogen pressure. The extruded polymer, after cooling, was examined by X-ray diffraction and found to be amorphous. The extruded polymer was annealed at 160° C. for 30 minutes, and resulted in 25% crystallinity. When these results are contrasted with those of Example I the advantages of an increased rate of crystallization of the present invention is clearly demonstrated.

EXAMPLE II

A series of strands of polystyrene containing tricresyl phosphate were prepared according to the procedure used in Example I. These strands were annealed by heating at various temperatures for different periods of time. The table below shows the effect of the various annealing times and temperatures on the crystalline polymer content, expressed as percentages.

*Table I*

| Time | 1 min. | 5 min. | 10 min. | 30 min. | 3 hrs. |
| --- | --- | --- | --- | --- | --- |
| Temp., °C.: | | | | | |
| 100 | | | | 4 | 50 |
| 120 | | 0 | 10 | 50 | 50 |
| 160 | | 15 | 50 | 50 | 50 |

When a strand of isotactic polystyrene to which no addition had been made was annealed it was found that a temperature of 160° C. and a time of three hours were required to obtain 50% crystallinity.

It may be seen that the time varies with the temperature; three hours being required at 100° C. and only 5 minutes being necessary at 160° C.

An attempt was made to double the concentration of the tricresyl phosphate but the resulting material showed poor tensile properties.

EXAMPLE III

A series of samples were prepared using a variety of the previously listed crystallization enhancers. The resulting compositions contained 85% isotactic polystyrene and 15% enhancer. They were annealed for 30 minutes at 160° C. The results are set forth in Table II below.

*Table II*

| Enhancer Used | Extrusion Conditions | | Crystallinity (Percent) | |
| --- | --- | --- | --- | --- |
| | Pressure (p.s.i.) | Cylinder Temp. (° C.) | Before Annealing | After Annealing |
| Tricresyl phosphate | 450 | 260 | 10 | 50. |
| Di-n-butyl phthalate | 750 | 265 | Amorphous | 50. |
| Di(2-ethylhexyl)phthalate | 900–1,200 | 270 | do | 50. |
| Di-n-butyl naphthalate | 900 | 270 | do | Trace. |
| Diethyl adipate | 1,000 | 276 | do | 50. |
| Dihexyl Azelate | 870 | 276 | 10 | 55. |
| HB-40 (a partially hydrogenated mixture of isometric terphenyls). | 750 | 260 | 10 | 55. |
| Arochlor 1248 (a polychlorinated polyphenol). | 1,100 | 265 | Amorphous | 50. |
| Chlorowax 40 (chlorinated paraffin) | Decomposed | 260 | | |
| Butyl "Cellosolve" stearate— $C_4H_9-O-C_2H_4-O-C-C_{17}H_{35}$ $\parallel$ $O$ | 1,000 | 268 | 15 | 50. |

EXAMPLE IV

A small sample of isotactic polystyrene containing 15% by weight of tricresyl phosphate was compression molded at a temperature of 430° F. and a pressure of 120 pounds per square inch for 10 minutes, then cooled to 150° F. to form a disk ⅞" in diameter and about ⅟₂₅" thick. The crystallinity of this specimen was determined by X-ray diffraction and found to be about 50%.

This invention results in an isotactic polystyrene composition which can be crystallized much more rapidly than heretofore. This material is also inherently less brittle than previously known isotactic polystyrenes. Additionally, it is more susceptible to fabrication by conventional methods.

We claim:
1. A process for promoting the crystallization of isotactic polystyrene comprising forming a homogeneous mixture of isotactic polystyrene and a crystallization enhancer that is an organic compound containing at least 12 carbon atoms which is selected from the class consisting of triaryl phosphates and alkyl diesters of dibasic acids, said crystallization enhancer being present in an amount of from 0.275 to 0.667 part per part of crystallizable polystyrene, forming said homogeneous mixture into a desired configuration and thereafter annealing said formed mixture until said isotactic polystyrene reaches maximum crystallinity.

2. A process for promoting the crystallization of isotactic polystyrene comprising forming a homogeneous mixture of isotactic polystyrene and a crystallization enhancer that is an organic compound containing at least 12 carbon atoms which is selected from the class consisting of triaryl phosphates and alkyl diesters of dibasic acids, said crystallization enhancer being present in an amount of from 0.275 to 0.667 part per part of crystallizable polystyrene, forming said homogeneous mixture into a desired configuration and thereafter annealing said formed mixture at a temperature of 140–200° C. until said isotactic polystyrene has reached maximum crystallinity.

3. A process of promoting the crystallization of isotactic polystyrene comprising forming a homogeneous mixture of isotactic polystyrene and a crystallization enhancer that is an organic compound containing at least 12 carbon atoms which is selected from the class consisting of triaryl phosphates and alkyl diesters of dibasic acids, said crystallization enhancer being present in an amount of from 0.275 to 0.667 part per part of crystallizable polystyrene, forming said homogeneous mixture into a desired configuration and thereafter annealing said formed mixture at a temperature of less than the melting point of said isotactic polystyrene until said isotactic polystyrene has reached maximum crystallinity.

4. A process for promoting the crystallization of isotactic polystyrene comprising forming a homogeneous mixture of isotactic polystyrene and a crystallization enhancer that is an organic compound containing at least 12 carbon atoms, which is selected from the class consisting of triaryl phosphates and alkyl diesters of dibasic acids, said crystallization enhancer being present in an amount of from 0.275 to 0.667 part per part of crystallizable polystyrene, forming said homogeneous mixture into a desired configuration and thereafter annealing said formed mixture at a temperature of approximately 160° C. until said isotactic polystyrene has reached maximum crystallinity.

5. A process for promoting the crystallization of isotactic polystyrene comprising forming a homogeneous mixture of isotactic polystyrene and a crystallization enhancer that is an organic compound containing at least 12 carbon atoms which is selected from the class consisting of triaryl phosphates and alkyl diesters of dibasic acids, said crystallization enhancer being present in an amount of 0.275 part per part of crystallizable polystyrene, forming said homogeneous mixture into a desired configuration and thereafter annealing said formed mixture at a temperature of approximately 160° C. for approximately 30 minutes.

6. A process for promoting the crystallization of isotactic polystyrene comprising forming a mixture of isotactic polystyrene and tricresyl phosphate, said tricresyl phosphate being present in an amount of 0.275 part per part of crystallizable polystyrene, forming said homogeneous mixture into a desired configuration and thereafter annealing said formed mixture at a temperature of 160° C. until said isotactic polystyrene has reached maximum crystallinity.

References Cited in the file of this patent

UNITED STATES PATENTS 2,691,647    Field et al. _____ Oct. 12, 1954
2,881,156    Pilar _____ Apr. 7, 1959

OTHER REFERENCES

Boundy-Boyer: "Styrene, Its Polymers, Copolymers, and Derivatives," Rheinhold Publishing Corp., New York, 1952, pp. 823–831.